US007728846B2

(12) United States Patent
Higgins et al.

(10) Patent No.: US 7,728,846 B2
(45) Date of Patent: Jun. 1, 2010

(54) METHOD AND APPARATUS FOR CONVERTING FROM SOURCE COLOR SPACE TO RGBW TARGET COLOR SPACE

(75) Inventors: Michael Francis Higgins, Cazadaro, CA (US); Candice Hellen Brown Elliott, Vallejo, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1300 days.

(21) Appl. No.: 10/691,377

(22) Filed: Oct. 21, 2003

(65) Prior Publication Data

US 2005/0083341 A1 Apr. 21, 2005

(51) Int. Cl.
*G09G 5/02* (2006.01)
*G06K 9/00* (2006.01)

(52) U.S. Cl. ....................... 345/600; 345/589; 345/590; 345/604; 382/167

(58) Field of Classification Search ................. 345/589, 345/591, 600, 603–605; 382/162, 165, 167
See application file for complete search history.

(56) References Cited

U.S. PATENT DOCUMENTS

| | | | | |
|---|---|---|---|---|
| 4,989,079 | A | 1/1991 | Ito | |
| 5,185,661 | A * | 2/1993 | Ng | 358/505 |
| 5,311,295 | A | 5/1994 | Tallman et al. | |
| 5,450,216 | A | 9/1995 | Kasson | |
| 5,668,890 | A | 9/1997 | Winkelman | |
| 5,694,186 | A * | 12/1997 | Yanagawa et al. | 349/106 |
| 5,724,442 | A | 3/1998 | Ogatsu et al. | |
| 5,937,089 | A * | 8/1999 | Kobayashi | 382/167 |
| 5,963,263 | A | 10/1999 | Shyu | |
| 5,987,165 | A | 11/1999 | Matsuzaki et al. | |
| 6,023,527 | A | 2/2000 | Narahara | |
| 6,421,142 | B1 * | 7/2002 | Lin et al. | 358/1.9 |
| 6,885,380 | B1 | 4/2005 | Primerano et al. | |
| 6,897,876 | B2 * | 5/2005 | Murdoch et al. | 345/589 |
| 6,980,219 | B2 | 12/2005 | Higgins | |
| 7,176,935 | B2 | 2/2007 | Higgins | |
| 7,301,543 | B2 | 11/2007 | Higgins | |
| 2003/0117457 | A1 | 6/2003 | Qiao | |
| 2003/0179212 | A1 | 9/2003 | Matsushiro et al. | |
| 2004/0056867 | A1 * | 3/2004 | Cui et al. | 345/590 |
| 2004/0111435 | A1 | 6/2004 | Herbert et al. | |
| 2005/0083344 | A1 | 4/2005 | Higgins | |

(Continued)

FOREIGN PATENT DOCUMENTS

GB 2282928 A * 4/1995

OTHER PUBLICATIONS

PCT International Search Report dated May 21, 2007 for PCT/US04/33709 (U.S. Appl. No. 10/691,396).

(Continued)

*Primary Examiner*—Xiao M Wu
*Assistant Examiner*—Tize Ma
(74) *Attorney, Agent, or Firm*—Innovation Counsel LLP

(57) ABSTRACT

Systems and methods are disclosed to effect conversion of a three color primary image data set to a multiple color primary set in which one of the primaries is white. One method converts a three-color image data set comprising C1, C2, and C3 colors into a four-color image data set comprising C1, C2, C3 and W colors.

27 Claims, 2 Drawing Sheets

U.S. PATENT DOCUMENTS

| | | | |
|---|---|---|---|
| 2005/0083345 | A1 | 4/2005 | Higgins |
| 2005/0083352 | A1 | 4/2005 | Higgins |
| 2005/0225561 | A1 | 10/2005 | Higgins et al. |
| 2005/0225562 | A1 | 10/2005 | Higgins et al. |
| 2005/0264580 | A1 | 12/2005 | Higgins |
| 2006/0244686 | A1 | 11/2006 | Higgins et al. |

OTHER PUBLICATIONS

PCT International Search Report dated Apr. 26, 2005 for PCT/US04/33743 (US Patent No. 7,176,935).

PCT International Search Report dated Jun. 21, 2006 for PCT/US05/01002 (U.S. Appl. No. 10/821,306).

USPTO, Notice of Allowance, dated Mar. 21, 2005 in US Patent No. 6,980,219 (U.S. Appl. No. 10/691,200).

USPTO, Non-Final Office Action dated Jul. 20, 2007 in US Patent Publication No. 2005/0264580 (U.S. Appl. No. 11/196,631).

Clairvoyante, Inc, Response to Non-Final Office Action dated Jan. 22, 2008 in US Patent Publication No. 2005/0264580 (U.S. Appl. No. 11/196,631).

USPTO, Non-Final Office Action dated Jul. 27, 2006 in US Patent Publication No. 2005/0083352 (U.S. Appl. No. 10/691,396).

Clairvoyante, Inc. Response to Non-Final Office Action, dated Dec. 20, 2006 in US Patent Publication No. 2005/0083352 (U.S. Appl. No. 10/691,396).

USPTO, Non-Final Office Action dated Mar. 6, 2007 in US Patent Publication No. 2005/0083352 (U.S. Appl. No. 10/691,396).

Clairvoyante, Inc. Response to Non-Final Office Action, dated Jul. 6, 2007 in US Patent Publication No. 2005/0083352 (U.S. Appl. No. 10/691,396).

USPTO, Non-Final Office Action dated Sep. 20, 2007 in US Patent Publication No. 2005/0083352 (U.S. Appl. No. 10/691,396).

Clairvoyante, Inc. Response to Non-Final Office Action, dated Mar. 20, 2008 in US Patent Publication No. 2005/0083352 (U.S. Appl. No. 10/691,396).

USPTO, Non-Final Office Action dated Jun. 13, 2005 in US Patent No. 7,176,935 (U.S. Appl. No. 10/690,716).

Clairvoyante, Inc. Response to Non-Final Office Action, dated Dec. 13, 2005 in US Patent No. 7,176,935 (U.S. Appl. No. 10/690,716).

Clairvoyante, Inc., Supplemental Amendment dated Aug. 23, 2006 in US Patent No. 7,176,935 (U.S. Appl. No. 10/690,716).

USPTO, Interview Summary, dated Aug. 25, 2006 in US Patent No. 7,176,935 (U.S. Appl. No. 10/690,716).

USPTO, Interview Summary, dated Aug. 29, 2006 in US Patent No. 7,176,935 (U.S. Appl. No. 10/690,716).

USPTO, Notice of Allowance, dated Jul. 27, 2007 in US Patent No. 7,301,543 (U.S. Appl. No. 10/821,386).

USPTO, Non-Final Office Action dated Sep. 18, 2007 in US Patent Publication No. 2005/0225562 (U.S. Appl. No. 10/821,306).

Clairvoyante Inc., Response to Non-Final Office Action dated Mar. 17, 2008 in US Patent Publication No. 2005/0225562 (U.S. Appl. No. 10/821,306).

USPTO, Final Office Action dated Apr. 14, 2008 in US Patent Publication No. 2005/0225562 (U.S. Appl. No. 10/821,306).

* cited by examiner

METHOD AND APPARATUS FOR CONVERTING FROM SOURCE COLOR SPACE TO RGBW TARGET COLOR SPACE

RELATED APPLICATIONS

The present application is related to commonly owned (and filed on even date) United States Patent Applications: (1) U.S. patent application Ser. No. 10/691,200 entitled "HUE ANGLE CALCULATION SYSTEM AND METHODS"; (2) U.S. patent application Ser. No. 10/691,396 entitled "METHOD AND APPARATUS FOR CONVERTING FROM A SOURCE COLOR SPACE TO A TARGET COLOR SPACE"; (3) U.S. patent application Ser. No. 10/690,716 entitled "GAMUT CONVERSION SYSTEM AND METHODS," which are hereby incorporated herein by reference.

BACKGROUND

In commonly owned U.S. patent applications: (1) U.S. patent application Ser. No. 09/916,232 ("the '232 application"), entitled "ARRANGEMENT OF COLOR PIXELS FOR FULL COLOR IMAGING DEVICES WITH SIMPLIFIED ADDRESSING," filed Jul. 25, 2001; (2) U.S. patent application Ser. No. 10/278,353 ("the '353 application"), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) U.S. patent application Ser. No. 10/278,352 ("the '352 application"), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) U.S. patent application Ser. No. 10/243,094 ("the '094 application), entitled "IMPROVED FOUR COLOR ARRANGEMENTS AND EMITTERS FOR SUB-PIXEL RENDERING," filed Sep. 13, 2002; (5) U.S. patent application Ser. No. 10/278,328 ("the '328 application"), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) U.S. patent application Ser. No. 10/278,393 ("the '393 application"), entitled "COLOR DISPLAY HAVING HORIZONTAL SUB-PIXEL ARRANGEMENTS AND LAYOUTS," filed Oct. 22, 2002; (7) U.S. patent application Ser. No. 01/347,001 ("the '001 application") entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, novel sub-pixel arrangements are therein disclosed for improving the cost/performance curves for image display devices and herein incorporated by reference.

For certain subpixel repeating groups having an even number of subpixels in a horizontal direction, the following systems and techniques to affect proper dot inversion schemes are disclosed and are herein incorporated by reference: (1) U.S. patent application Ser. No. 10/456,839 entitled "IMAGE DEGRADATION CORRECTION IN NOVEL LIQUID CRYSTAL DISPLAYS"; (2) U.S. patent application Ser. No. 10/455,925 entitled "DISPLAY PANEL HAVING CROSSOVER CONNECTIONS EFFECTING DOT INVERSION"; (3) U.S. patent application Ser. No. 10/455,931 entitled "SYSTEM AND METHOD OF PERFORMING DOT INVERSION WITH STANDARD DRIVERS AND BACKPLANE ON NOVEL DISPLAY PANEL LAYOUTS"; (4) U.S. patent application Ser. No. 10/455,927 entitled "SYSTEM AND METHOD FOR COMPENSATING FOR VISUAL EFFECTS UPON PANELS HAVING FIXED PATTERN NOISE WITH REDUCED QUANTIZATION ERROR"; (5) U.S. patent application Ser. No. 10/456,806 entitled "DOT INVERSION ON NOVEL DISPLAY PANEL LAYOUTS WITH EXTRA DRIVERS"; and (6) U.S. patent application Ser. No. 10/456,838 entitled "LIQUID CRYSTAL DISPLAY BACKPLANE LAYOUTS AND ADDRESSING FOR NON-STANDARD SUBPIXEL ARRANGEMENTS".

These improvements are particularly pronounced when coupled with sub-pixel rendering (SPR) systems and methods further disclosed in those applications and in commonly owned U.S. patent applications: (1) U.S. patent application Ser. No. 10/051,612 ("the '612 application"), entitled "CONVERSION OF RGB PIXEL FORMAT DATA TO PENTILE MATRIX SUB-PIXEL DATA FORMAT," filed Jan. 16, 2002; (2) U.S. patent application Ser. No. 10/150,355 ("the '355 application"), entitled "METHODS AND SYSTEMS FOR SUB-PIXEL RENDERING WITH GAMMA ADJUSTMENT," filed May 17, 2002; (3) U.S. patent application Ser. No. 10/215,843 ("the '843 application"), entitled "METHODS AND SYSTEMS FOR SUB-PIXEL RENDERING WITH ADAPTIVE FILTERING," filed Aug. 8, 2002; (4) U.S. patent application Ser. No. 10/379,767 entitled "SYSTEMS AND METHODS FOR TEMPORAL SUB-PIXEL RENDERING OF IMAGE DATA" filed Mar. 4, 2003; (5) U.S. patent application Ser. No. 10/379,765 entitled "SYSTEMS AND METHODS FOR MOTION ADAPTIVE FILTERING," filed Mar. 4, 2003; (6) U.S. patent application Ser. No. 10/379,766 entitled "SUB-PIXEL RENDERING SYSTEM AND METHOD FOR IMPROVED DISPLAY VIEWING ANGLES" filed Mar. 4, 2003; (7) U.S. patent application Ser. No. 10/409,413 entitled "IMAGE DATA SET WITH EMBEDDED PRE-SUBPIXEL RENDERED IMAGE" filed Apr. 7, 2003, which are hereby incorporated herein by reference.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

In the co-pending application entitled "METHOD AND APPARATUS FOR CONVERTING FROM A SOURCE COLOR SPACE TO A TARGET COLOR SPACE", there is described a technique for converting from one color space to another, multi-primary space in which the multi-primary space is broken up into triangles on the CIE chromaticity diagram. The triangles are laid out between adjacent primary colors and the white-point. Normally, in a 4 color multi-primary display, there would be 4 triangles. If, however, W is one of the primary colors, and lies directly underneath the white-point at least one of the triangles collapses into a straight line. However, as will be discussed in greater detail below, for each of the triangles, there are resulting matrices that have non-zero coefficients for the primaries that are not on the corners of the triangle. These coefficients are one solution for W in the RGBW system.

Figure 1:
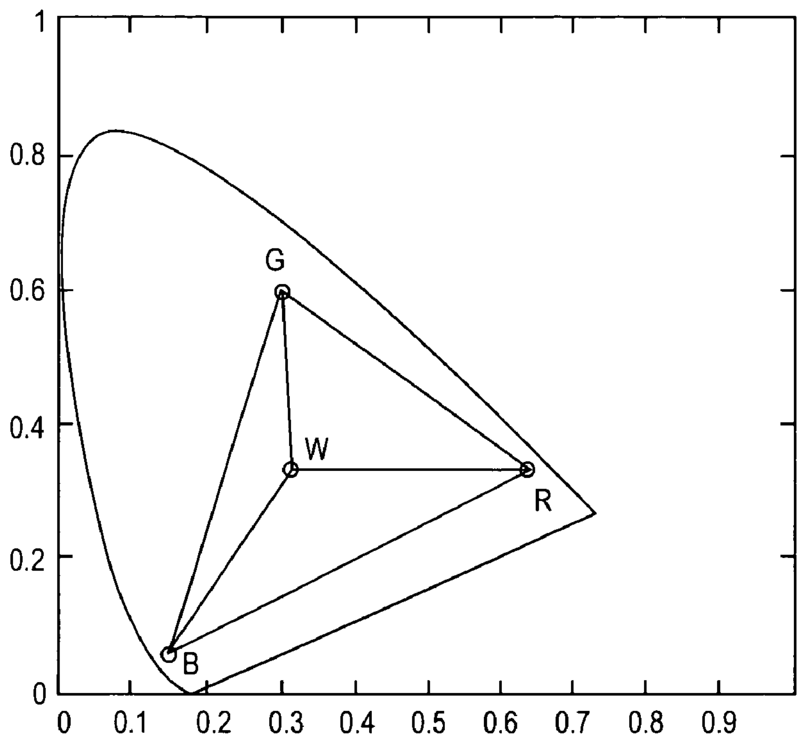
FIG. 1 shows a color space in which four primaries break up the space into various regions.

One embodiment of the present RGBW conversion system proceeds as if there are 4 primaries, but divides the chromaticity diagram into three triangles. FIG. 1 shows the general situation—with RGBW primaries within the CIE color chart. Of course, it will be appreciated that the present system and techniques will work for any 4-color primary system with W as one of the primaries (e.g. CMYW and the like). With such a system, one possible solution for RGBW arises from the three matrices that each have coefficients for the fourth primary which will linearly interpolate white values from 0 at the primary base of the triangles to 1 at the white-point. It will be appreciated that—although triangles are a natural choice for the regions bounded by W and two of R, G, and B—other regions are possible for purposes of the present invention. It will also be appreciated that there may be more than three non-white primaries.

An example using the present system will now be described. When characterizing any display, it is common to use a colorimeter to measure the chromaticity of red ($x_r$,$y_r$) green ($x_g$,$y_g$) blue ($x_b$,$y_b$) and the CIE XYZ co-ordinates of the white-point ($X_w$,$Y_w$,$Z_w$). The "little z" co-ordinates for red green and blue may be calculated using the formula z=1−x−y. Using standard conversion equations, it is possible to also calculate ($x_w$,$y_w$,$z_w$) from the white-point. Plugging these into a matrix conversion equation and expanding the formula to work with the 4-color RGBW system yields:

$$\begin{pmatrix} X \\ Y \\ Z \end{pmatrix} = \begin{pmatrix} x_r \cdot Cr & x_g \cdot Cg & x_b \cdot Cb & x_w \cdot Cw \\ y_r \cdot Cr & y_g \cdot Cg & y_b \cdot Cb & y_w \cdot Cw \\ z_r \cdot Cr & z_g \cdot Cg & z_b \cdot Cb & z_w \cdot Cw \end{pmatrix} \cdot \begin{pmatrix} R \\ G \\ B \\ W \end{pmatrix} \quad \text{Equation 1}$$

This equation will convert RGBW values into CIE XYZ once the "C" coefficients are calculated. To calculate them, it is possible to substitute the white-point ($X_w$,$Y_w$,$Z_w$) in for (X Y Z), substitute the value (1 1 1 1) for the expected RGBW value, and factor the C values out into a separate vector to yield:

$$\begin{pmatrix} X_w \\ Y_w \\ Z_w \end{pmatrix} = \begin{pmatrix} x_r & x_g & x_b & x_w \\ y_r & y_g & y_b & y_w \\ z_r & z_g & z_b & z_w \end{pmatrix} \cdot \begin{pmatrix} Cr \\ Cg \\ Cb \\ Cw \end{pmatrix} \quad \text{Equation 2}$$

Alternatively, it might be possible to use different values for [Xw,Yw,Zw]—other than the standard white-point—to change the resulting equation for: (1) different backlights of target multi-primary displays; or (2) if the source image data was created under a given assumption about its white point or its measured primaries that differ from the target display. This change in the white point might correct for color differences between those assumptions under which the source image data was created and the display characteristics upon which the source image data will be rendered.

It will be noted that the center matrix is a 3×4 matrix and, hence, does not have an inverse. Instead, it is possible to use a numerical solver package to find one of many sets of solutions to the C values. The resulting Cr Cg Cb and Cw values may then be plugged back into Equation 1 to fill in the last unknowns. With these values, Equation 1 may now convert any RGBW value to CIE XYZ, but it may be desired to have an inverse mapping of sorts. It will also be appreciated that any other predetermined value for the RGBW-tuple in Equation 1 could be employed—but the choice of such a known tuple would change the C's found in Equation 2.

As the center matrix in Equation 1 is not square and cannot be inverted to create an inverse equation, Equation 3 is such a possible inverse mapping using known values and Equation 1 to solve for the matrix in Equation 3 for each of the triangles in FIG. 1.

$$\begin{pmatrix} R \\ G \\ B \\ W \end{pmatrix} = \begin{pmatrix} R1 & R2 & R3 \\ G1 & G2 & G3 \\ B1 & B2 & B3 \\ W1 & W2 & W3 \end{pmatrix} \cdot \begin{pmatrix} X \\ Y \\ Z \end{pmatrix} \quad \text{Equation 3}$$

Next using the known RGBW co-ordinates for red (1,0,0,0) green (0,1,0,0) and white (1,1,1,1), Equation 1 can be used to find the matching CIE XYZ co-ordinates. A numerical solver can then find a solution for the 3x4 matrix in Equation 3 that will produce these three results. This is the matrix that can convert any CIE XYZ color whose chromaticity is inside the RGW triangle in FIG. 1 into RGBW. The same procedure is performed using the known RGBW co-ordinates for green (0,1,0,0) blue (0,0,1,0) and white (1,1,1,1) to produce a matrix that can convert any color whose chromaticity is inside triangle GBW in FIG. 1. The same procedure is performed using the known RGBW co-ordinates for blue (0,0,1,0) red (1,0,0,0) and white (1,1,1,1) to produce a matrix that can convert any color whose chromaticity is inside triangle BRW in FIG. 1.

These three matrices are calculated once beforehand and combined with other conversion matrices as necessary. For example, if the three-valued input colors are REC 709 RGB values sometimes called sRGB, then the standard conversion matrix for turning sRGB values into CIE XYZ could be combined with each of the RGBW matrices to change them into matrices that directly convert sRGB into RGBW. Once the three matrices are constructed, they are stored as tables in software conversion methods or burned into the ROM of a hardware conversion apparatus.

The REC 709 chromaticity values are red (0.64, 0.33) green (0.30, 0.60) and blue (0.15, 0,06). The D65 standard white-point CIE XYZ value is (0.950468, 0.999999, 1.088970). If these standard recommended values are used as the input values for the above procedure, the resulting matrix for Equation 1 is:

| | | | |
|---|---|---|---|
| 0.299845 | 0.260683 | 0.131481 | 0.257989 |
| 0.154608 | 0.521367 | 0.052593 | 0.271433 |
| 0.014055 | 0.086894 | 0.692468 | 0.295582 |

Then the matrix for equation 3 that works in the RGW triangle on FIG. 1 is:

| | | |
|---|---|---|
| 4.436563 | −2.03784 | −1.08265 |
| −1.350209 | 2.649123 | −0.335905 |
| 0.055635 | −0.203996 | 1.057069 |
| 0.055635 | −0.203996 | 1.057069 |

The resulting matrix for equation 3 that works in the GBW triangle of FIG. 1 is:

| | | |
|---|---|---|
| 3.240696 | −1.537253 | −0.498569 |
| −2.53408 | 3.144689 | 0.242317 |
| −1.13095 | 0.292705 | 1.636617 |
| 3.240696 | −1.537253 | −0.498569 |

Finally, the matrix for equation 3 that works in the BRW triangle of FIG. 1 is:

| | | |
|---|---|---|
| 4.821372 | −2.818797 | −0.701364 |
| −0.96926 | 1.876 | 0.041556 |
| 0.437457 | −0.978892 | 1.435395 |
| −0.96926 | 1.876 | 0.041556 |

This set of matrices will convert CIE XYZ to RGBW for the special case where the RGBW primaries match the REC 709 and D65 standards. This may serve as useful conversions for testing or for easy implementation purposes. However, for any specific display, it may be desirable to measure the actual chromatic ties and generate matrices specifically calibrated for the class of display. It is to be appreciated that similar analysis may lead to RGBW conversion from other tristimulus color spaces such as YCbCr, as converting these color space formats to an RGB format is well known in the art.

RGBS Gamut Limits

Figure 2:
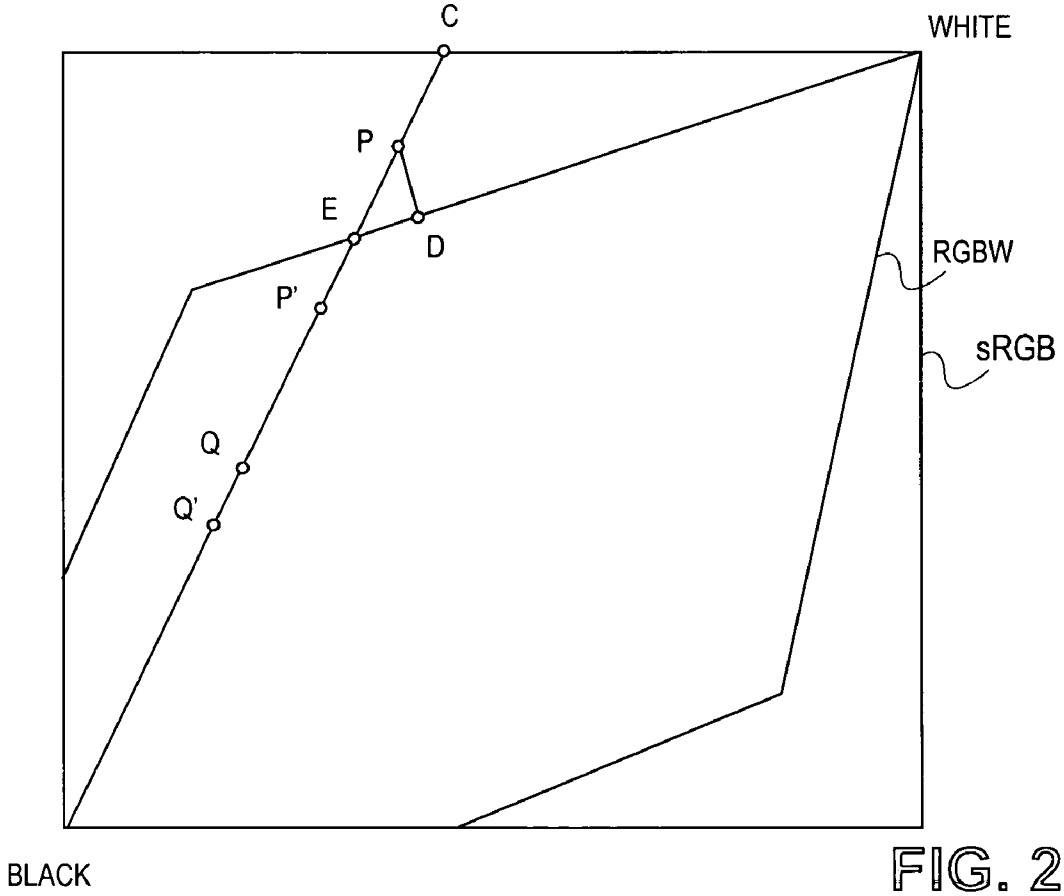
FIG. 2 depicts two color spaces and sample image data points to exemplify in-gamut and out-of-gamut conditions.

When using the above matrices to convert sRGB to RGBW images, it may be the case that the gamut of RGBW does not have quite the same volume as sRGB. Both color spaces may have the same gamut in CIE chromaticity, but RGBW is not able to display all those colors at all luminosities. The result is that there are some colors in sRGB that cannot be displayed when converted to RGBW. This is shown in the 2 dimensional diagram of FIG. 2. This figure is a simplified diagram of a slice through the two color-spaces with the differences exaggerated for explanatory purposes. The central hexagonal area represents the colors that can be displayed in RGBW while the outer square is the colors representable by sRGB. It should be noted that both color-spaces are drawn so that white is the same point in both spaces (i.e. normalized at maximum luminance). All the points in FIG. 2 are considered after they are converted to RGBW space, so some of them will be out-of gamut.

It is possible to detect when colors are out of gamut in RGBW (or any multiprimary color space, for that matter) by checking for values that are out of bounds. If color components are calculated on the range 0-255, these out-of-gamut values will be larger than 255. One embodiment clamps all the resulting color components to the maximum allowed value. However, this results in a change in the hue of the resulting color. FIG. 2 shows an example of this effect. The point P is a color that is outside the RGBW gamut and results in out-of-gamut values. If the out-of-gamut values are simply clamped to the maximum allowed values, the resulting color would be color D. It may be more desirable to have the color E as the resulting color which also lies on the edge of the RGBW color gamut but has the same hue as the original color P.

To calculate the correct color E the following procedure is used: When an out-of gamut color is detected, the maximum of the four RGBW color components is found. The ratio between the maximum allowed value (usually 255) and the maximum RGBW value is a scale factor that is then used to correct all four of the RGBW components. Scaling all four of the components by the same number preserves hue and results in the correct color E instead of the "simple clamped" color D.

It should be noted that although hue is preserved this is still a clamping process, all the colors on the line E-C will all be clamped to the single color E. In some prior art, a scaling factor is calculated that scales all the colors on the line BLACK-C. This scales the color at point C so that it lands at point E and scales the color at point P so that it lands at point P'. This kind of gamut scaling has the effect that it changes the color of point Q to Q'—making some colors dimmer than they possibly need to be. The present embodiment does not have this effect—the color at point Q remains bright and is not replaced with the dim color at point Q'.

The above clamping has the advantage of matching the ensemble image statistics that indicate that it is rare to have both high saturation and high luminance. That is to say, that the colors that are out of gamut are not often encountered in natural photographic images. Additionally, the human eye is less able to distinguish differences in luminosity at the higher end of the scale, thus the loss of such differences, quantizing all out of gamut colors to the maximum in gamut color of the same hue is unlikely to be noticed by any but the most sophisticated viewer.

Figure 3:
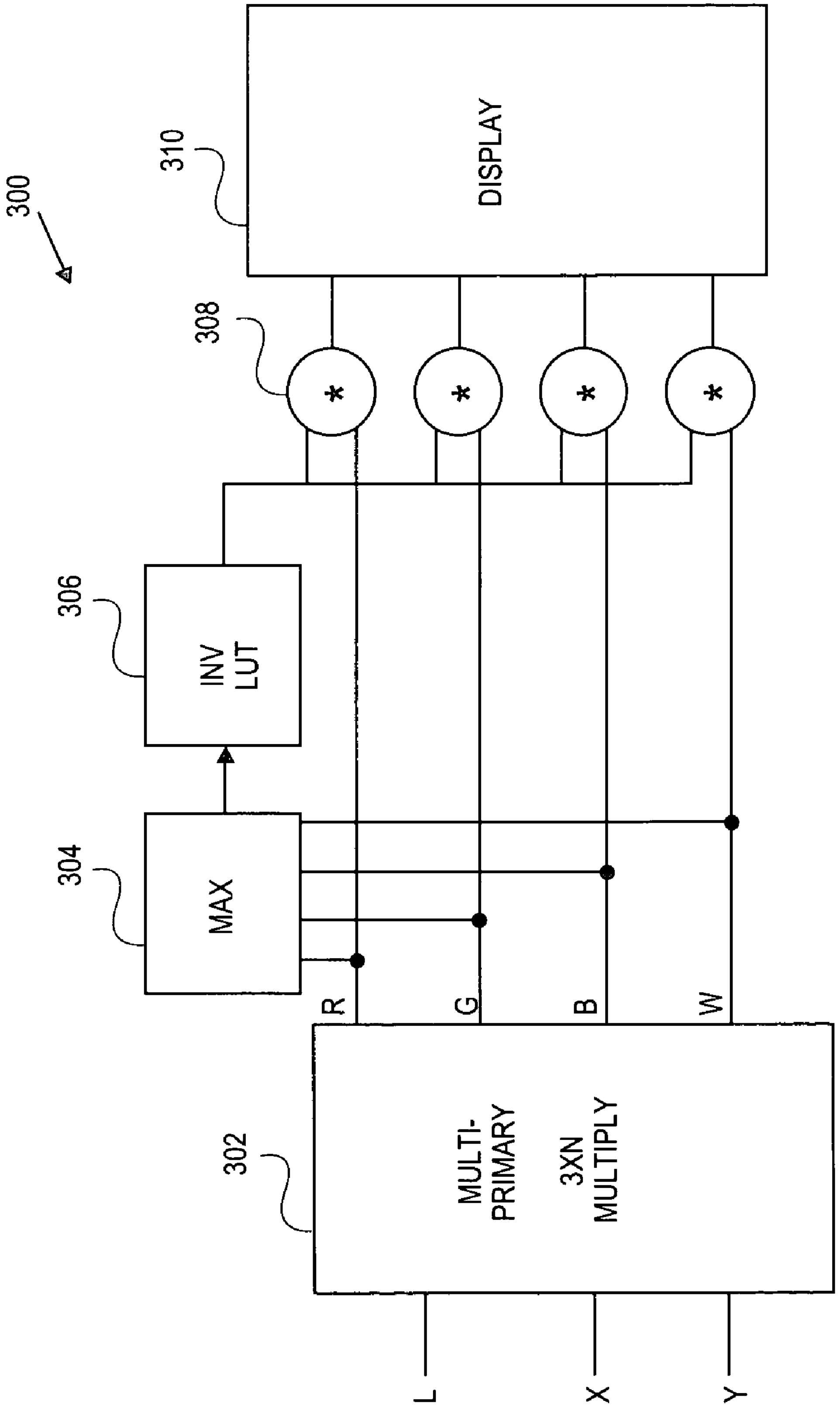
FIG. 3 shows one embodiment of a gamut conversion system as made in accordance with the principles of the present inventions.

The process of calculating the scale factor can be done by using the maximum RGBW value as an index into a table of inverse values. Ordinarily, using a table of inverses results in some errors. However, in this case the range on possible values of the maximum RGBW value makes all the inverse values fall on a "good" section of the 1/x curve and not on the tail where most of the errors are introduced. As a result an apparatus built to this design could be done with an inverse table and a multiplier, saving the complexity of doing a divide. FIG. 3 shows such an apparatus.

FIG. 3 shows a section of a gamut pipeline 300. Chroma/luma data (e.g. L,x,y) is converted by 3×n matrix multiplier 302 into RGB and W components—which can result in RGBW values out-of-gamut. If the data is out of gamut, one of the RGB data will be larger than what the display 310 can render. When one or more of these color components are out of range of the display, MAX detector 304 will detect this condition and output the maximum out of range component to the inverse look-up table (LUT) 306. The LUT will output a scale factor that will cause the multipliers 308 to scale the RGBW values back into gamut range. In the case that the original RGB values were in gamut range, MAX unit and inverse LUT are designed to output a scale factor of 1 to leave the image values the same. In another embodiment, another detector would be necessary to detect the in-gamut colors and multiplex them around the multipliers directly to the display.

In the above embodiments, reference to functional blocks can be implemented using any combination of hardware and/or software, including components or modules such as one or more memory devices or circuitry. For example, a programmable gate array or like circuitry can be configured to implement such functional blocks. In other examples, a microprocessor operating a program in memory can also implement such functional blocks.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method for converting a three-color image data set comprising C1, C2, and C3 colors into a four-color image data set comprising C1, C2, C3 and W colors, the method comprising:

dividing a color space comprising a C1, C2, C3, and W color point into a set of regions bounded by W and two of a group, said group comprising: C1, C2 and C3; and determining, in a processor, a mapping from image data points in any one of said regions, said image data points comprising C1, C2 and C3 color values, to image data points comprising C1, C2, C3, and W; and detecting, by a detector, image data points that are out-of-gamut;

scaling only the out-of-gamut image data points to produce corresponding color image data points that are within gamut range, the scaling performed according to a scaling factor that is determined according to a ratio between the maximum allowed value and the maximum value of C1, C2, C3, and W.

2. The method of claim 1 wherein the three colors C1, C2, and C3 comprise R, G and B.

3. The method of claim 1 wherein the regions bounded by W and two of a group, said group comprising C1, C2 and C3 comprises triangles.

4. The method of claim 1 wherein the determining of a mapping further comprises:

setting the white point in the four-color space to a desired value; and calculating intermediate coefficients for the four colors using the desired white point.

5. The method of claim 4 wherein said calculating of the intermediate coefficients further comprises solving the following matrix equation for the values Cr Cg Cb and Cw:

$$\begin{pmatrix} X_w \\ Y_w \\ Z_w \end{pmatrix} = \begin{pmatrix} x_r & x_g & x_b & x_w \\ y_r & y_g & y_b & y_w \\ z_r & z_g & z_b & z_w \end{pmatrix} \cdot \begin{pmatrix} Cr \\ Cg \\ Cb \\ Cw \end{pmatrix}.$$

6. The method of claim 4 wherein setting the white point further comprises setting the white point to adjust to different backlighting condition for target displays.

7. The method of claim 4 wherein setting the white point further comprises setting the white point to adjust between difference between the white point of the source image data and the white point of the target display.

8. The method of claim 4 wherein the determining of a mapping further comprises:

calculating the mapping to four color space from said intermediate coefficients with the following matrix:

$$\begin{pmatrix} R \\ G \\ B \\ W \end{pmatrix} = \begin{pmatrix} R1 & R2 & R3 \\ G1 & G2 & G3 \\ B1 & B2 & B3 \\ W1 & W2 & W3 \end{pmatrix} \cdot \begin{pmatrix} X \\ Y \\ Z \end{pmatrix}.$$

9. The method of claim 8 wherein calculating the mapping to four color space further comprises calculating source and destination colors for groups of known primaries and white-points, and numerically solving for the mapping that produce said known primaries.

10. The method of claim 1 wherein said method further comprises:

detecting four color image data points that are out-of-gamut;

effecting a change as a function of the out-of-gamut coefficients to produce a color image data point that is within gamut range.

11. The method of claim 10 wherein said step of detecting out-of-gamut color image data points further comprises:

testing each color component of the image data point to see if the color component is out of range.

12. The method of claim 11 wherein the step of effecting a change in only the out-of-gamut coefficients further comprises:

clamping the out-of-range color components to the maximum value allowed for the given component.

13. The method of claim 11 wherein the step of effecting a change in only the out-of-gamut coefficients further comprises:

correcting all four colors by using the scaling factor.

14. An image system comprising:

a display for displaying a three-color image data set comprising C1, C2, and C3 colors converted into a four-color image data set comprising C1, C2, C3 and W colors; and processing circuitry to divide a color space comprising a C1, C2, C3, and W color point into a set of non-overlapping regions bounded by W and two of a group, said group comprising: C1, C2 and C3 and to determine a mapping from image data points in any one of said regions, said image data points comprising C1, C2 and C3 color values, to image data points comprising C1, C2, C3, and W and out-of-gamut detecting circuitry for detecting image data points that are out-of-gamut;

scaling circuitry for scaling only the out-of-gamut image data points to produce corresponding color image data points that are within gamut range, the scaling performed according to a scaling factor that is determined according to a ratio between the maximum allowed value and the maximum value of C1, C2, C3, and W.

15. The image processing system of claim 14 wherein the three colors C1, C2, and C3 comprise R, G and B.

16. The image processing system of claim 14 wherein the regions bounded by W and two of a group, said group comprising C1, C2 and C3 comprises triangles.

17. The image processing system of claim 14 wherein the processing circuitry is configured to set the white point in the four-color space to a desired value and calculate intermediate coefficients for the four colors using the desired white point.

18. The image processing system of claim 14 wherein the processing circuitry is to calculate the intermediate coefficients using the following matrix equation for the values Cr Cg Cb and Cw:

$$\begin{pmatrix} X_w \\ Y_w \\ Z_w \end{pmatrix} = \begin{pmatrix} x_r & x_g & x_b & x_w \\ y_r & y_g & y_b & y_w \\ z_r & z_g & z_b & z_w \end{pmatrix} \cdot \begin{pmatrix} Cr \\ Cg \\ Cb \\ Cw \end{pmatrix}.$$

19. The image processing system of claim 18 wherein the processing circuitry is to set the white point to adjust to different backlighting condition for target displays.

20. The image processing system of claim 18 wherein the processing circuitry is to set the white point to adjust between difference between the white point of the source image data and the white point of the target display.

21. The image processing system of claim 20 wherein the processing circuitry is to calculate the mapping to four color space from said intermediate coefficients with the following matrix:

$$\begin{pmatrix} R \\ G \\ B \\ W \end{pmatrix} = \begin{pmatrix} R1 & R2 & R3 \\ G1 & G2 & G3 \\ B1 & B2 & B3 \\ W1 & W2 & W3 \end{pmatrix} \cdot \begin{pmatrix} X \\ Y \\ Z \end{pmatrix}.$$

22. The image processing system of claim 14 wherein the processing circuitry is to detect four color image data points that are out-of-gamut and effect a change as a function of the out-of-gamut coefficients to produce a color image data point that is within gamut range.

23. The image processing system of claim 22 wherein the processing circuitry is to test each color component of the image data point to see if the color component is out of range.

24. The image processing system of claim 23 wherein the processing circuitry is to clamp the out-of-range color components to the maximum value allowed for the given component.

25. The image processing system of claim 24 wherein the processing circuitry is scale the color components of the out-of-gamut image data point with a ratio between the maximum allowed value and the maximum coefficients of the out-of-gamut image data point.

26. A method for scaling out-of-gamut colors when mapping first colored image data in a first three-color space to second colored image data into a second color space comprising more than three colors wherein one such more than three colors is white, the steps of said method comprising:

mapping, in a processor, said first colored image data to said second colored image data;

detecting, by a detector, any said second colored image data as being out-of-gamut in said second color space;

scaling only the color components of the out-of-gamut second colored image data, the scaling performed according to a ratio between the maximum allowed value and the maximum coefficient of said out-of-gamut second colored image data.

27. The method of claim 26 wherein said scaling further comprises the step of looking up said scaling factor in an inverse look-up table.

* * * * *